(No Model.)
W. MOREHOUSE.
Anti-Incrustator for Steam Boilers.
No. 229,051. Patented June 22, 1880.
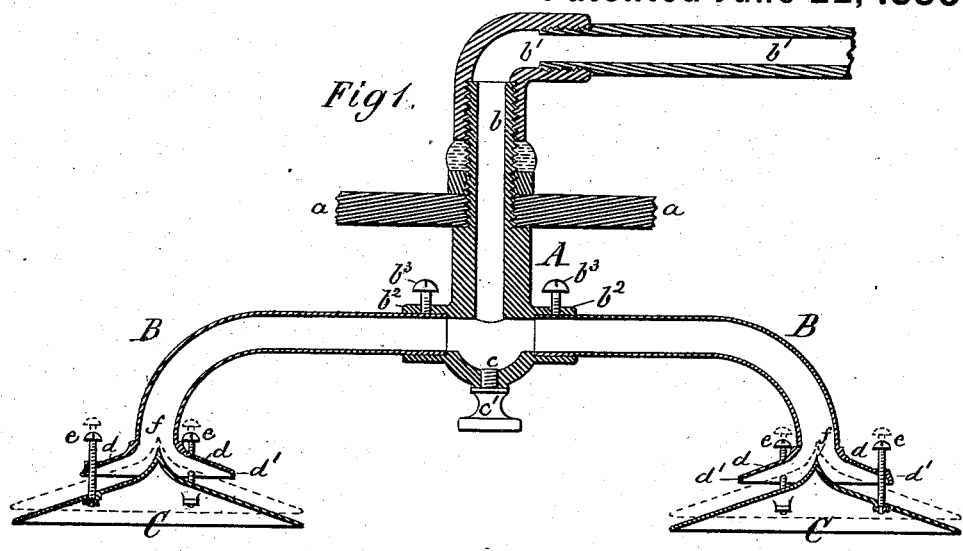
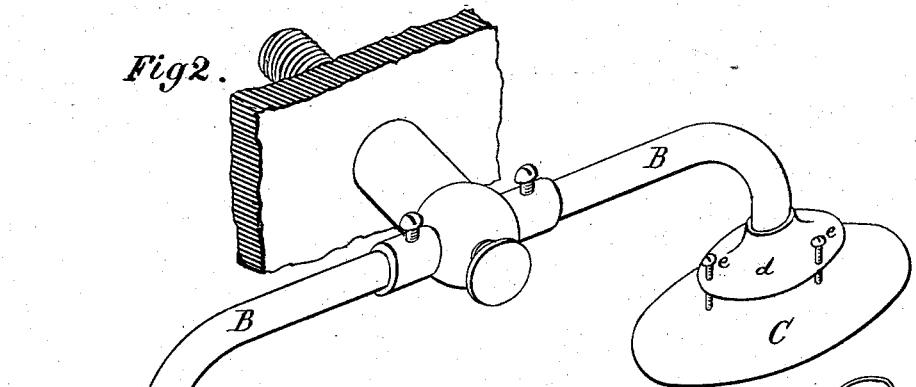
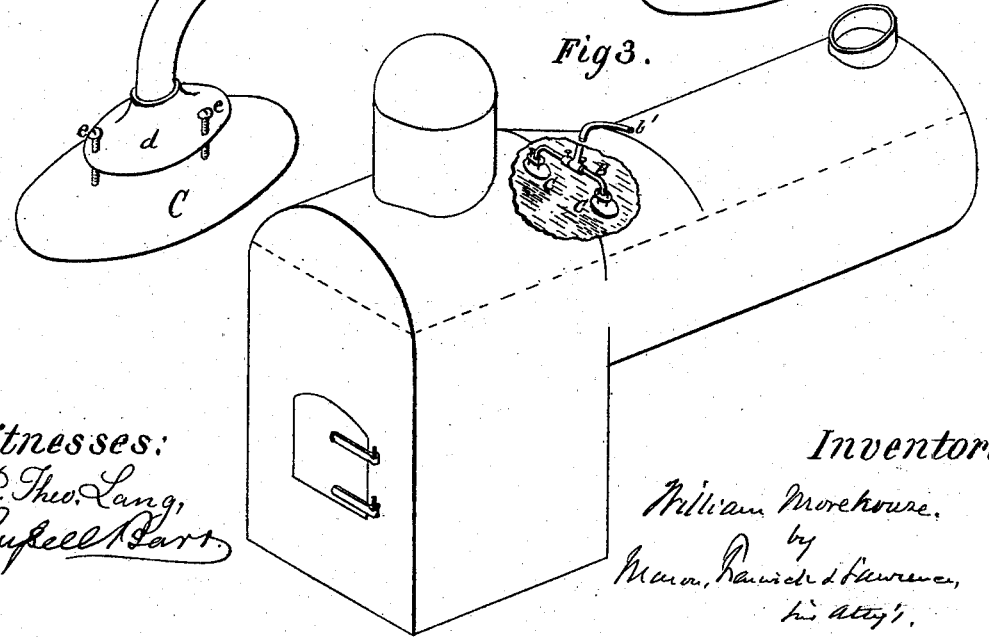
Witnesses:
J. P. Theo. Lang,
J. Russell Hart
Inventor:
William Morehouse,
by
Mason, Fenwick & Lawrence,
his Atty's.

UNITED STATES PATENT OFFICE.

WILLIAM MOREHOUSE, OF BUFFALO, NEW YORK.

ANTI-INCRUSTATOR FOR STEAM-BOILERS.

SPECIFICATION forming part of Letters Patent No. 229,051, dated June 22, 1880.

Application filed May 17, 1880. (No model.)

*To all whom it may concern:*

Be it known that I, WILLIAM MOREHOUSE, a citizen of the United States, residing in the city of Buffalo, in the county of Erie and State of New York, have invented a new and useful improvement in apparatus for preventing the formation of scale upon the interior surface of steam-boilers, and which apparatus I designate an "Anti-Incrustator for Steam-Boilers;" and I do hereby declare that the following is a full, clear, and exact description thereof, reference being had to the annexed drawings, and the letters of reference marked thereon, forming a part of this specification, in which drawings—

Figure 1 is a central vertical longitudinal section of my aforesaid improved apparatus, its feed-pipe shank being inserted through the top of a boiler. Fig. 2 is a perspective view of the same, the feed-pipe shank being represented as passing through either the side or the end of a boiler, and with its branch pipes turned down so as to discharge the feed-water perpendicular to the water-line of the boiler; and Fig. 3 is a like view, the feed-pipe shank being passed through the sloping top portion of a locomotive "wagon-top" boiler.

The nature of my invention, in the main, consists in an apparatus for use in the steam-space of steam-boilers which shall in such manner present the feed-water supplied through said apparatus to the action of live steam in said steam-space as to insure a separation of the foreign or mineral elements from the water during its passage from the apparatus to the water-line of the boiler, and which apparatus shall also subserve the purpose of a check-valve to shut out the steam from the feed-pipe during the operation of supplying the boiler with feed-water.

It also consists in having the feed-pipe connected with one or more branch pipes, from which latter the feed-water is discharged into the boiler, the branch pipes being made adjustable, so that the discharge of water therefrom may be perpendicular to the water-line of the boiler, although the feed-pipe may enter the boiler at a point other than at its top.

In the drawings, A indicates the shank portion of my improved anti-incrustator, the same being passed through a top sheet-section, $a$, of a steam-boiler, and with its screw end $b$ connected with the feed-water pipe $b'$ of the boiler, as shown, or in any proper manner to effect a steam-tight connection, said shank portion practically constituting a continuation of the feed-water pipe $b'$. This shank portion A, near its lower end, is provided with short tubes $b^2$, and is made dishing, as at $c$, and with such portion either solid or perforated, so as to receive a screw-plug, $c'$, as shown.

B B are branch pipes having their inner ends fitted into the short tubes $b^2$, and so as to turn therein and be held in the position to which they may be adjusted by means of set-screws, as at $b^3$. The outer ends of the branch pipes B terminate in conical disks $d$, which have a turned-down rim, as at $d'$, the pipes and disks being made of a single piece of metal.

C C are hollow conical metal disks of much greater diameter than the disks $d$, and are suspended beneath the disks $d$ by means of screw adjusting-bolts $e$, three in number, (one not shown in the figures,) which pass through the disks $d$, and are so applied to the disks C and $d$ that by screwing said bolts to the right or left the lower disk, C, will be elevated or depressed, so as to more or less close the discharge ends of the branch pipes B, as indicated in dotted lines in Fig. 1.

In the operation of my improved apparatus the feed-water supplied to the boiler passes through the feed-pipe $b'$ into the shank portion A. The water thence, in a divided stream, passes on through the branch pipes B B. In these branch pipes the water is still further diminished in escaping volumes by the adjustment of the disks C toward the disks $d$ to such extent as will only permit the passage into the boiler of the required supply of water, the total volume of water so escaping into the boiler being much less than that supplied within the feed-pipe $b'$ and the branch pipes B B, thereby rendering the flow of water constant between the disks, and so enabling the adjustable disk C to serve, in connection with the disk $d$, as a check-valve to prevent the entrance of steam into the feed-pipe.

The disk C, it will be seen, is so adjusted that its apex $f$ enters centrally within the water-way of the pipe B, so that as the water passes from the pipe B it will be spread over the upper surface of the disk C in a sheet of uniform thickness, the inner surface of the disk *d* serving to give direction to the flow of the water upon the disk C, while its turned-down rim *d'*, slightly checking the sheet-current, compels it to hug down upon the disk C, and so flow therefrom in a uniform unbroken circular sheet to the water-line of the boiler, at which point the feed-water mingles with the main body of the water of the boiler, the same being delivered from disk C to said water-line somewhat in the likeness of an inverted bowl.

During such descent of the feed-water the live steam of the boiler not only surrounds the sheet, but fills its interior, thereby imparting its full effect for the separation of all impurities from the feed-water, and causing them to settle at once either into the stand-pipe or upon the bottom of the boiler, whence they can be blown off, instead of circulating with the water in solution or suspension, and finally settling on the inner surface of the boiler-sheets in the form of scale.

It is manifest that a single pipe, B, having disks *d* and C applied thereto, as shown, might be used in connection with a feed-pipe for supplying feed-water to a boiler, and that the same might be used with the pipe B standing perpendicular to the water-line of the boiler when the feed-water is supplied through the top of the boiler, as indicated in Fig. 1.

By my aforesaid construction it will be seen that the feed-water is prevented from coming in contact with the crown-sheets of the boiler, as is liable to be the case when water is supplied in jets or spray from an upwardly-directed delivery-pipe, that between the feed-supply pipe and the final discharge of the water into the steam-space of the boiler there are no intervening parts which are liable to become clogged with impurities in the water, and that my improved apparatus may readily be applied to a boiler at a point other than at its top, and yet have the feed-water delivered directly down (or nearly so) to the water-line of the main body of the water in the boiler.

I claim—

1. In an apparatus for preventing the formation of scale in steam-boilers, the disk C, having a conical form, the apex of which is in line with the center of the delivery end of the supply-pipe B, and adapted to be adjusted more or less into the delivery end of said pipe, substantially as and for the purpose described.

2. The combination of the disk *d*, having a downwardly-turned rim, *d'*, and the disk C, both disks being applied upon the discharge end of a branch supply-pipe, B, substantially as and for the purpose described.

3. The branch supply-pipe B, carrying disk C and disk *d*, applied to the shank A, and made adjustable therein, substantially as and for the purpose described.

WM. MOREHOUSE.

Witnesses:
H. A. HALL,
J. RUSSELL BARR.